(12) United States Patent
Vaddi et al.

(10) Patent No.: US 6,555,021 B2
(45) Date of Patent: Apr. 29, 2003

(54) PREPARATION OF ZNS:CU,CL ELECTROLUMINESCENT PHOSPHOR

(75) Inventors: Butchi Reddy Vaddi, Sayre, PA (US); Shellie K. Northrop, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 91 days.

(21) Appl. No.: 09/945,534

(22) Filed: Sep. 1, 2001

(65) Prior Publication Data

US 2003/0047715 A1 Mar. 13, 2003

Related U.S. Application Data

(60) Provisional application No. 60/256,277, filed on Dec. 18, 2000.

(51) Int. Cl.⁷ .......................... C09K 11/54; C09K 11/56
(52) U.S. Cl. ............................................... 252/301.365
(58) Field of Search ..................... 252/301.65

Primary Examiner—C. Melissa Koslow
(74) Attorney, Agent, or Firm—William H. McNeill

(57) ABSTRACT

A process for improving the half-life of ZnS:Cu,Cl electroluminescent phosphor wherein the improvement comprises firing a previously first fired material comprised of ZnS:Cu,Cl with a quantity of $MgSO_4 \cdot 7H_2O$ to form a second fired material. The quantity is from 0.015 to 0.15 mole of $MgSO_4 \cdot 7H_2O$/mole of ZnS.

4 Claims, No Drawings

PREPARATION OF ZNS:CU,CL ELECTROLUMINESCENT PHOSPHOR

This application claims priority from Provisional Patent Application No. 60/256,277, filed Dec. 18, 2000.

TECHNICAL FIELD

This invention relates to phosphors and more particularly to electroluminescent phosphors. Still more particularly, it relates to a process for improving the half-life of such phosphors.

BACKGROUND ART

Phosphors are a known class of materials that emit electromagnetic radiation in response to stimulation by a form of energy. Generally, the emission of the phosphors is in the visible region of the spectrum. These phosphors are delineated by the form of energy to which they are susceptible, thus: cathode ray tube phosphors are stimulated to emission by impingement of electrons; photoluminescent phosphors are stimulated to emission by actinic radiation; x-ray phosphors are stimulated to emission by the impingement of x-rays; and electroluminescent (hereinafter, EL) phosphors are stimulated to emission by placement in an alternating electric field. It is the latter type of material to which this invention is directed, particularly such phosphors based on ZaS and activated with Cu and Cl.

EL phosphors have many commercial uses such as for LCD back-light, copy machines, automotive dashboard displays, nightlights, control switch illumination, emergency lighting, watch dials, etc. Their value lies in their long life and high electrical resistance, making them very economical to operate; however, these materials, as do most phosphors, do lose some of their light output over time.

It would, therefore, be an advance in the art if the lifetimes of these materials could be increased.

DISCLOSURE OF INVENTION

It is an object of this invention to obviate the disadvantages of the prior art.

It is another object of the invention to enhance EL phosphors.

These objects are accomplished, in one aspect of the invention, by a process for improving the half-life of ZnS:Cu,Cl electroluminescent phosphor wherein the improvement comprises firing a previously first fired material comprised of ZnS:Cu,Cl with a quantity of $MgSO_4 \cdot 7H_2O$ to form a second fired material said quantity being from 0.015 to 0.15 mole of $MgSO_4 \cdot 7H_2O$ mole of ZnS.

Improvements in the half-life of phosphors so processed can be up to 14%.

BEST MODE FOR CARRYING OUT THE INVENTION

For a better understanding of the present invention, together with other and further objects, advantages and capabilities thereof, reference is made to the following disclosure and appended claims.

A first fired material (ZnS:Cu, Cl) is prepared as follows; Appropriate amounts (as is known in the art) of ZnS containing 1% (by weight) chloride, $CuSO_4$ as a primary activator, and ZnO are blended together with flux materials comprising 3% $BaCl_2$, 3% $MgCl_2$ and 2% NaCl (by weight of the ZnS). This blended material is placed in covered crucibles and fired in a furnace at 1205° C. for 5 hours and 15 minutes. To make a smaller particle size first fired material, firing is usually limited to 3 hours.

After firing, the cakes are removed from the furnace, cooled and washed with deionized (hereinafter, DI) to remove fluxes, and the material is then dried. The dried material is then subjected to mechanical work damage, as in a mill for a specific time to induce or enhance the transformation of hexagonal ZnS to the cubic form of ZnS. The milling time is typically about an hour and a half. The first fired material at this stage of the process, is substantially EL inactive.

In the prior art processes, this first fired material was subsequently second fired with $CuSO_4$ and $ZnSO_4 \cdot 7H_2O$ to form the EL phosphor. This material is shown as the control in the illustrations that follow. It has been discovered that a significant improvement in EL phosphors can be made if $MgSO_4 \cdot 7H_2O$ is substituted for the $ZnSO_4 \cdot 7H_2O$.

To illustrate the invention, two lots of first fired material (hereinafter, FFM) were utilized.

The first lot, shown in Table I and subsequently designated 351–47, was fired for 3 hours during the first firing step. The second lot, shown in Table II and subsequently designated 351–69, was fired for 5 and ¼ hours. Tables I and II show the components and the amounts used in the second firing.

TABLE I

| Raw Materials | Control Sample 1 | Sample 2 | Sample 3 | Sample 4 | Sample 5 |
|---|---|---|---|---|---|
| FFM ZnS:Cu$_3$Cl | 75.00 gms | 75.00 gms | 75.00 gms | 75.00 gms | 75.00 gms |
| CuSO$_4$ | 1.86 gms | 1.86 gms | 1.86 gms | 1.86 gms | 1.86 gms |
| ZnSO$_4$.7H$_2$O | 19.17 gms | 0.00 gms | 0.00 gms | 0.00 gms | 0.00 gms |
| MgSO$_4$.7H$_2$O | 0.00 0.00 mole/ZnS | 2.85 gms 0.015 mole/ZnS | 5.69 gms 0.03 mole/ZnS | 18.97 gms 0.10 mole/ZnS | 28.46 gms 0.15 mole/ZnS |

TABLE II

| Raw Materials | Control Sample 1 | Sample 2 | Sample 3 | Sample 4 | Sample 5 |
|---|---|---|---|---|---|
| FFM ZnS:Cu$_3$Cl | 75.00 gms | 75.00 gms | 75.00 gms | 75.00 gms | 75.00 gms |
| CuSO$_4$ | 1.86 gms | 1.86 gms | 1.86 gms | 1.86 gms | 1.86 gms |

TABLE II-continued

| Raw Materials | Control Sample 1 | Sample 2 | Sample 3 | Sample 4 | Sample 5 |
|---|---|---|---|---|---|
| $ZnSO_4.7H_2O$ | 19.17 gms | 0.00 gms | 0.00 gms | 0.00 gms | 0.00 gms |
| $MgSO_4.7H_2O$ | 0.00 | 2.85 gms | 5.69 gms | 18.97 gms | 28.46 gms |
|  | 0.00 mole/ZnS | 0.015 mole/ZnS | 0.03 mole/ZnS | 0.10 mole/ZnS | 0.15 mole/ZnS |

These materials were blended in plastic bottles for twenty minutes on a mechanical shaker. The blended materials were removed and any lumps were crushed. This material was loaded into 100 ml alumina crucibles, covered with alumina lids and fired in an electric furnace for two hours and 15 minutes at 700° C. The crucibles were removed from the furnace after firing and cooled to room temperature. After cooling the cakes were washed at least twice with DI water. Each wash was performed with 1.242 liters of DI water per 75 grams of second fired material. After the water wash the material was acid washed to remove excess copper and any other flux additives and impurities. The acid used was acetic acid (0.777 liters of hot DI water+148.8 ml of glacial acetic acid for every 75 grams of second fired material). This acid-washed material was then again rinsed with DI water, at least twice or until the pH is ~6.

This now acid-free material was then washed with a KCN solution (0.777 liters of hot DI water +37.54 grams of KCN per 75 grams of second fired material) and allowed to settle for 20 to 30 minutes. After decanting the KCN, the phosphor material was again washed with DI water to remove any traces of residual KCN. At this point in the process the phosphor material turns from a greenish-gray body color to light green. The phosphor was then filtered, dried at ~120° C. for 4–16 hours and then sifted through a –325 mesh stainless steel sieve. The result phosphor was made into lamps and tested, with the results shown in Table III.

Substitution of $MgSO_4.7H_2O$ for $ZnSO_4.7H_2O$ in the second fired material improves the half-life of the phosphor when compared to the control sample prepared from the same base lot of ZnS:Cu,Cl material. The 24 hour brightness remained essentially constant regardless of the firing time for the first fired material; however, samples prepared with the 5 and ¼ hour first step firing gave brighter phosphor, on average, than the 3 hour first fired material.

The half-life of the phosphor appears to initially increase with increase in $MgSO_4.7H_2O$ amount and then decrease as that amount is increased. Experiments with the 3 hour first step fired material show an improvement in lifetime up to 14% by the addition of 0.015 mole of $MgSO_4.7H_2O$ per mole of ZnS. The half-life of phosphors synthesized with the 5 and ¼ hour first step fired materials also showed improvement by 14%, but by the addition of higher amounts (ie, 0.03 mole) of $MgSO_4.7H_2O$ per mole of ZnS, beyond which the lifetime stayed relatively constant.

Samples synthesized with both first step fired lots showed essentially no change in Y values compared to the control sample in each set. However, samples prepared using the 5 and ¼ hour first step fired materials gave about 20 block higher Y-values compared to the set of samples prepared with the 3 hour first step fired material.

Regardless of the first step fired material, final particle size from both sets of samples were similar. The X-Ray diffraction data (XRD) indicate that the samples synthesized with the 5 and ¼ hour material had nearly 80% cubic phase. Samples synthesized with the 3 hour material showed only <50% cubic phase. The higher brightness recorded for the 351-69 series of samples may be due to the higher percentage conversion of ZnS to the cubic phase.

Thus there is here provided a method of preparing electroluminescent phosphors having a longer half-life.

While there have been shown and described what are at present considered to be the preferred embodiments of the invention, it will be apparent to those skilled in the art that various changes and modifications can be made herein without departing from the scope of the invention as defined by the appended claims.

TABLE III

| Sample | $ZnSO_4.7H_2O$ | $MgSO_4.7H_2O$ | Color Coordinates X and Y | 24 Hr Brightness Ft. Lamberts | Half-life, Hours | Particle Size. Coulter 50% Spat. Um | XRD % Cubic | Efficiency LPW |
|---|---|---|---|---|---|---|---|---|
| 357-47-1 Control | 19.17 gm | 0.00 gm | 0.173 0.402 | 28.7 | 380.4 | 24.38 | 41 | 5.565 |
| 357-47-2 | 0.00 | 2.85 gm | 0.172 0.392 | 29.6 | 532 | 25.33 | 31 | 4.974 |
| 357-47-3 | 0.00 | 5.69 gm | 0.172 0.395 | 30.1 | 437 | 25.01 | 48 | 4.967 |
| 357-47-4 | 0.00 | 18.97 gm | 0.171 0.398 | 30.4 | 400 | 23.87 | 41 | 5.422 |
| 357-47-5 | 0.00 | 28.46 gm | 0.171 0.400 | 30.2 | 406 | 24.79 | 44 | 5.358 |
| 351-69-1 Control | 19.17 gm | 0.00 | 0.177 0.427 | 35.1 | 795 | 24.78 | 82 | N.A. |
| 351-69-2 | 0.00 | 2.85 gm | 0.182 0.419 | 32.7 | 642 | 24.95 | 75 | 3.75 |
| 351-69-3 | 0.00 | 5.69 gm | 0.182 0.415 | 34.6 | 881 | 24.47 | 83 | 2.65 |
| 351-69-4 | 0.00 | 18.79 gm | 0.183 0.422 | 35.5 | 883 | 23.72 | 85 | 3.1 |
| 351-69-5 | 0.00 | 28.46 | 0.184 0.433 | 35.1 | 697 | 23.02 | 80 | 3.68 |

What is claimed is:

1. A process for improving the half-life of ZnS:Cu,Cl electroluminescent phosphor wherein the improvement comprises firing a first fired material comprised of ZnS:Cu, Cl with a quantity of $MgSO_4.7H_2O$ to form a second fired material, said quantity being from 0.015 to 0.15 mole of $MgSO_4.7H_2O$ mole of ZnS.

2. The process of claim 1 wherein said firing is at a temperature of about 700° C.

3. The process of claim 2 wherein said firing is for about 2 and ¼ hours.

4. The process of claim 3 wherein said second fired material is cooled to room temperature, washed with deionized water, washed with acetic acid, and second washed with deionized water to a pH ~6, washed with KCN, and washed with deionized water again to remove residual KCN.

* * * * *